Patented June 10, 1941

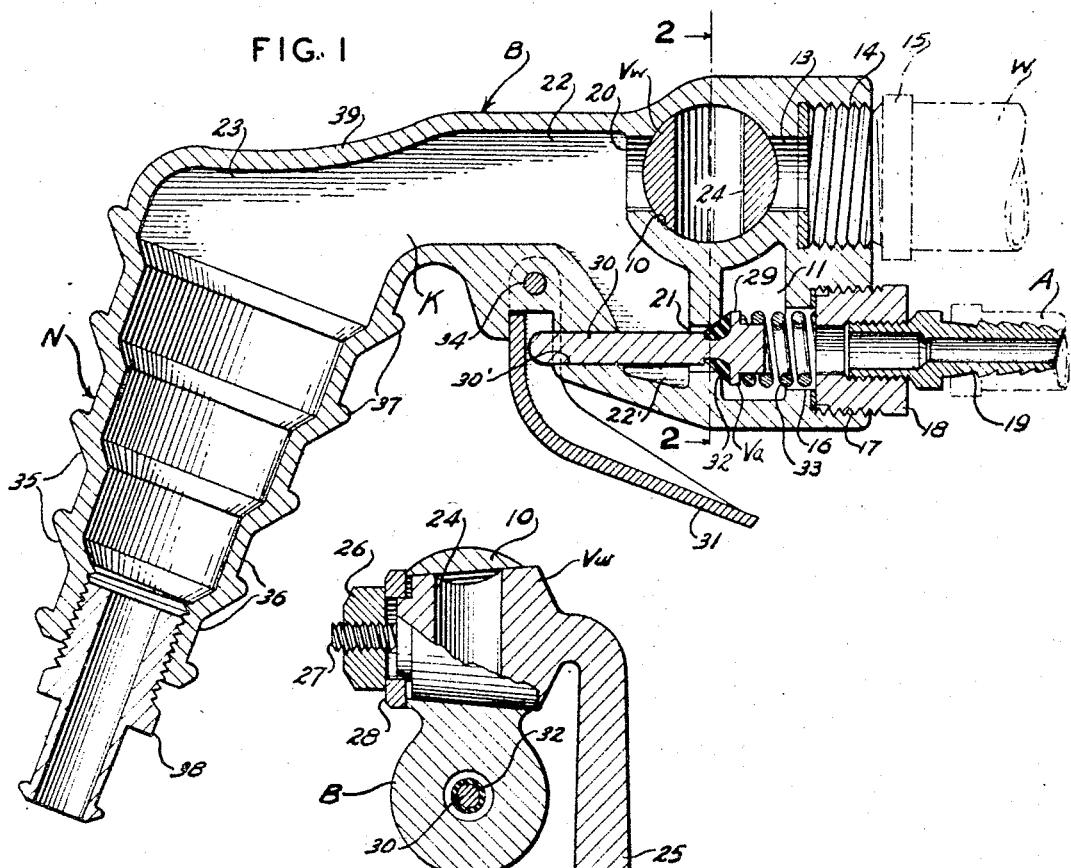
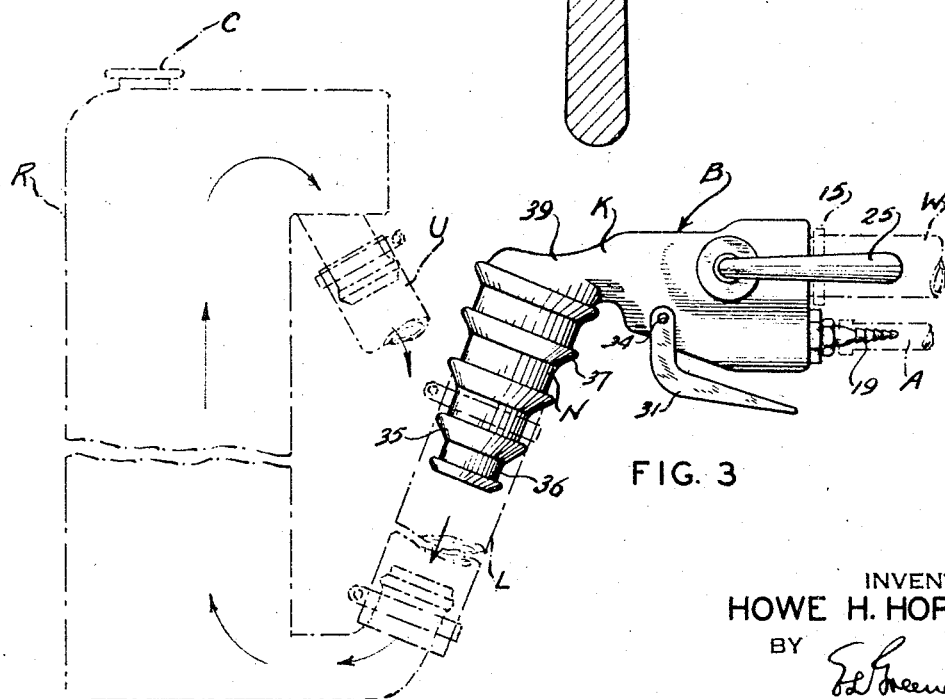

2,245,195

UNITED STATES PATENT OFFICE 2,245,195

COOLING SYSTEM FLUSHING GUN

Howe H. Hopkins, Detroit, Mich., assignor to National Carbon Company, Inc., a corporation of New York Application May 7, 1936, Serial No. 78,314

10 Claims. (Cl. 141—1)

This invention relates to flushing guns, and more particularly to improved means for cleaning out automobile radiators and the like.

In cooling systems, such as those employed in automobiles, deposits of oxides, scale and other foreign matter in the cooling fluid accumulate gradually upon the heat radiating surfaces so as to constrict the passages, impede normal circulation, and retard proper transfer of heat.

When cleansing automobile radiators, the interior surfaces generally are first treated with a suitable chemical solution to loosen or dissolve the scale and foreign matter, after which the loosened and dissolved matter is removed by flushing the system with a combined stream of water and blast of air.

A substantially continuous flow of water together with intermittent surges of air is preferable. It is important that the operator have complete control of the flow of both water and air at all times and that he be enabled to manipulate the air blast in small pressure increments through the use of a conveniently located valve. It is also of great advantage if the radiator may be flushed without requiring its removal from the automobile.

Accordingly, the principal objects of the present invention are: To provide a simple, light and relatively inexpensive flushing gun which will enable the operator to easily maintain complete control of water and air flow at the gun; to provide an improved nozzle adapting the flushing gun to be easily and firmly secured to flexible hose connections of a wide range of sizes; to provide a flushing gun arranged so as to permit its use in unusually close quarters; and to provide a new and improved air valve construction having a sensitive control. These and other objects of the invention will become apparent from the following specification in conjunction with the accompanying drawing illustrating the invention adapted for use in cleaning an automobile radiator.

In the drawing,

Fig. 1 is a longitudinal cross sectional view through a flushing gun embodying this invention;

Fig. 2 is a cross sectional view taken on the line 2—2 of Fig. 1; and

Fig. 3 is an elevational view of the flushing gun shown in operative relation to an automobile radiator.

As shown, the flushing gun comprises a valve body B, a nozzle N, and a short neck K connecting the nozzle to the valve body, these parts preferably being cast in one piece from a suitable light corrosion-resisting metal, such as an aluminum alloy. The valve body B comprises inlet or valve chambers 10 and 11 respectively housing the water control valve Vw and the air control valve Va. The valve chamber 10 has an inlet 13 which communicates with a threaded socket 14 in the body B to receive the threaded coupling 15 at the end of the water supply hose W. Similarly, the valve chamber 11, located below the chamber 10, has an inlet 16 which communicates with a threaded socket 17 in the body B to receive the externally and internally threaded annular coupling 18 secured to a nipple 19 at the end of the compressed air supply hose A. Suitable gaskets may be provided to prevent leakage between the couplings and their sockets. The valve chambers 10 and 11 have parallel disposed ports or outlets 20 and 21, respectively, which communicate with the main passage 22 in the neck K, and the latter opens directly into the outlet passage 23 which extends through the nozzle N. The outlet 20 is substantially in line with the passage 22, and the latter is connected to the outlet 21 by a forwardly inclined branch passage 22', of smaller cross section than the main passage 22.

The water control valve Vw, as shown, preferably is of the rotatable plug type and is provided with a passage 24 extending therethrough and adapted to connect the inlet 13 and outlet 20 of the chamber 10. The axis of the rotatable valve Vw is perpendicular to the common axis of the inlet 13 and outlet 20; and an operating lever 25 is secured to the valve Vw to turn the latter into open or closed position. A nut 26 is threaded upon a spindle 27 extending axially of the valve Vw and by engagement with a washer 28 maintains the tapered valve body in operative position within the chamber 10.

The air control valve Va, preferably of the poppet type, comprises a head 29 disposed in the valve chamber 11 and a stem 30 extending forwardly through but spaced from the outlet 21, through the branch passage 22', and through a closely fitting opening or bore 30' in the valve body B to guide the valve stem and to expose its outer end in position for operation by a lever 31. A suitable annular valve disc 32 is secured to one side of the head of the valve Va to cooperate with a seat around the outlet 21 formed in a partition integral with the body and dividing the chamber 11 from the passage 22'. The valve disc 32 is normally held tightly against its seat by a helical spring 33, one end of which bears against a shoulder on the head of the valve Va and the other end of which extends into the inlet opening 16 and bears against the inner face of the coupling plug 18. The diameter of the inlet 16 is sufficiently large to permit the valve Va and its associated spring 33 to be withdrawn through the inlet 16 for repairs or replacements. The valve Va is opened by exerting pressure against the projecting end of the stem 30 to move the valve disc 32 axially away from its seat. Control of the valve movement is preferably accomplished with a lever 31 pivoted at its forked end to the valve body B by means of a pin 34, extending through the body at a point adjacent to the intersection of the main and branch passages 22 and 22'. The stem 30 contacts the lever 31 near the fulcrum so as to obtain sensitive control of the valve Va. The lever 31 continues rearwardly along the under side of the body B so as to be in a protected position and to be easily accessible to the operator's fingers when grasping the gun.

The nozzle N comprises a hollow tapered body provided with a converging passage 23. The wall of the nozzle consists of a series of hollow graduated conical elements 35 converging generally toward the tip of the nozzle, joined by a corresponding series of graduated cylindrical sleeves 36. The conical elements 35 extend outwardly slightly beyond the sleeves 36 so as to form annular flanges 37. The conical elements 35 and the flanges 37 are dimensioned to accommodate standard hose sizes. The conical faces converge at a relatively large angle so as to prevent unnecessary stretching of the circulatory system hose during an attempt to insert the nozzle too far therein. An angle of substantially 40° with the axis has been found satisfactory as this degree of convergence discourages the operator from inserting the nozzle past the proper sized flange 37. The smallest sleeve 36 at the tip of the nozzle is threaded internally to detachably receive an adaptor 38. The adaptor which is intended for use with very small tubing, as, for example, that employed with fluid type automobile heaters, is removed from the nozzle when the flushing gun is used with larger sized tubing so as not to unnecessarily impede the flow.

The hollow neck K houses the passage 22 and joins the nozzle N with the body B. The passage 22' extends upwardly and forwardly from the air outlet 21 to the water outlet 20 to form a mixing chamber for the respective fluids, and opens obliquely into the lower side of the main passage 22. From the outlet 20 the passage 22 continues in a straight line toward the nozzle N where it joins with passage 23. The neck K is provided with a concave or sloping roof or wall 39 adjacent to the large diameter end of the nozzle N so as to form substantially a cap or closure therefor, facilitating insertion and removal of the nozzle in close quarters, and the neck merges with the walls of the nozzle adjacent to the cap about an annular zone in a plane substantially normal to the axis of the nozzle. The nozzle is disposed at an oblique angle to the straight portion of the passage 22, and the neck K extends through the top of the nozzle in a generally radial direction, which results in a considerable shortening of the flushing gun and further adapts it for use where clearances are close. Preferably the nozzle is disposed at an obtuse angle, slightly in excess of 90° and less than 120° with respect to the straight portion of the passage 22.

If it is desired to flush a radiator R, shown in broken lines in Fig. 3, the gun is preferably clamped to a lower or inlet hose connection L so that the cleansing flow follows a direction opposite to that of the normal flow of cooling fluid within the radiator, as this arrangement admits of more efficient removal of deposited foreign material. The cap C may be left in position, and the radiator drained from an upper or discharge hose connection U as indicated by the arrows. When cleaning out an automobile cooling system, the radiator and engine head are preferably treated separately, so it is desirable to uncouple the upper hose joining the radiator and the water jacket connection on the head. If desired, the usual short connection U may be replaced by a longer discharge hose which may extend to beneath the chassis to provide for proper drainage of the discharged mixture. Similarly if the limited amount of space does not permit insertion of the flushing gun directly into the usual lower hose connection L, a longer section of flexible tubing may be substituted so as to facilitate insertion, adjustment, and manipulation of the gun.

The valve body B and the straight portion of the neck K constitute a handle for the gun which may be grasped within the palm of one hand by the operator, leaving the other hand free, for example, to adjust the water valve Vw, to steady the operator when manipulating in awkward positions, or to allow him to grasp the discharge hose U. If the discharge hose connects with the bottom of the engine jacket it may thereby be raised by the operator to a point above the level of the water jacket to allow completely filling the block with water prior to applying the air pressure. The air valve lever or trigger 31 may be actuated with the fingers of the hand grasping the gun. Although the water valve may be operated by the thumb of the same hand, it is preferably controlled by the other hand. Both the water and air valves are thus positioned for easy manipulation, and the gun can be held and operated easily with one hand, especially since the gun is made in a compact form, and of light parts.

With the accumulated deposits previously loosened, the flushing gun is mounted in the position shown in Fig. 3, and hoses W and A are connected to respective sources of water and air. Water under the usual pressure of city mains is satisfactory, but the air supply preferably should be under higher pressure. The water valve Vw is first opened part or full way to start the flow of water coursing through the radiator. Opening the valve Va produces a blast which causes the air and water mixtures to surge violently through the radiator carrying with it deposits of rust, scale, and sediment. If the radiator is badly clogged, the cleaning operation should be started with a very moderate flow of both air and water so as to minimize any destructive tendencies of the blast. After the initial surges have carried away a portion of the deposit, the air and water valves may be opened to full capacity.

Preferably the air pressure is applied intermittently, for example during intervals of from one to ten seconds, as under these conditions it mixes turbulently with the water in the passage 22 forcing it violently through the system to be cleaned in a series of blasts. If an engine water jacket is to be cleaned, the gun is preferably secured to the upper connection so that the cleaning flow is in a direction opposite to the normal flow of cooling fluid. Through the use of one or more adaptors of a type shown in Fig. 1, the gun may be employed for use with any desired hose size.

By the present arrangement of the air and water connection, the respective hoses A and W may be maintained parallel and in close relation to one another, and tendencies toward kinking are minimized. While specific reference has been made to air and water for cleaning purposes, it is obvious that other liquid flushing fluids such as kerosene or gasoline may be similarly employed, and that other gaseous fluids may be substituted for air. By positioning the lever 31 in the crotch formed beneath the handle through the angular disposition of the body B with respect to the nozzle N, a large degree of protection is afforded the lever against damage which otherwise might result during, for instance, unintentionally dropping the gun.

It is to be understood that minor changes may be made in the construction shown without departing from the invention or sacrificing its advantages.

I claim:

1. A flushing gun comprising a handle, and a nozzle communicating at the top portion with said handle and being disposed at substantially a right angle with respect thereto, said nozzle and handle being joined by a neck having a concave wall substantially covering the top of said nozzle.

2. A flushing gun comprising a handle, a generally frusto-conical shaped nozzle angularly disposed with respect to said handle, and a hollow neck connecting said nozzle and said handle, said neck being provided with a concave sloping wall forming substantially a cap for the large diameter end of said nozzle.

3. A flushing gun comprising a nozzle; a hollow handle connected with one end of said nozzle for conducting fluids from a supply source to said nozzle, said handle forming an angle with the axis of said nozzle slightly in excess of a right angle, said handle being provided with a sloping neck extending across said end of said nozzle to form substantially a cap therefor, said cap merging with the walls of said nozzle and having portions located in a plane substantially normal to the axis of said nozzle.

4. A flushing gun comprising, in combination, a generally conical nozzle having an outlet passage; a body having a relatively short neck integrally connected to said nozzle and to said body, said neck extending obliquely toward the axis of said nozzle and substantially covering the large diameter end of said nozzle, said body constituting a handle adapted and constructed to be gripped in the palm of an operator's hand to facilitate manipulation of said gun and insertion of the discharge end of said nozzle into an opening in a conduit or radiator to be flushed, said body having a main passage extending through said neck and opening directly into the entrance of the nozzle outlet passage, said body also having a branch passage of smaller cross section than said main passage and opening obliquely into the lower side of the latter, said body having a water-valve chamber and a water inlet substantially in line with said main passage and adapted to supply water to the latter; a water control valve extending into said water-valve chamber; said body having an air-valve chamber and an air inlet located below said water-valve chamber and said water inlet, respectively, and adapted to supply compressed air to said branch passage; an air control valve extending into said air-valve chamber; and independently operable devices for opening said valves, both of said devices being disposed outside said body and being adjacent to portions of said body gripped by an operator's hand.

5. A flushing gun as claimed in claim 4, in which said water control valve is rotatable in its chamber to turn on or shut off the flow of water to said main passage; and said air control valve is a poppet valve having a stem projecting outside of said body; and the device for opening said air control valve comprises a lever normally extending along the under side of said body and having one end pivoted to said body adjacent to the juncture of said main passage and said branch passage.

6. A flushing gun as claimed in claim 4, in which said air-valve chamber has a port connecting it to said branch passage, said air control valve comprises a stem extending through both said port and said branch passage and having its end projecting outside said body; and the device for operating said air valve comprises a lever pivoted to said body and adapted to engage said end of said stem to unseat said air control valve.

7. A cooling system flushing gun for cleaning automobile radiators, and the like comprising, in combination, a nozzle having an outlet passage; a body having a main passage; a short neck integrally joining said main passage with said nozzle passage; a branch passage opening into said main passage; said body having a water-valve chamber and a water inlet communicating with said main passage; a water control valve extending into said water-valve chamber; said body having an air-valve chamber and an air inlet communicating with said branch passage, said air inlet comprising an annular coupling detachably secured in an opening in said body; an air valve in said air-valve chamber and having a stem projecting outside said body at a point opposite said coupling; a spring in said air-valve chamber and bearing against the inner side of said coupling and against said air valve to normally seat the latter; and devices for independently operating said valves, including a lever pivotally mounted on said body and operable to engage the projecting end of said stem to unseat said air valve, the construction being such that said coupling may be detached from said body, and said air valve and spring may be removed from said air-valve chamber through said opening without disturbing said lever.

8. A flushing gun comprising, in combination, a nozzle having an outlet passage; a body having a water-valve chamber, and a main passage extending from said water-valve chamber and opening directly into said nozzle passage; a water valve in said water-valve chamber; means for opening and closing said water valve; said body having an air-valve chamber and a branch passage extending from said air-valve chamber and opening into said main passage; said body having an integral partition between said air-valve chamber and said branch passage, said partition having a port and said branch passage having a wall provided with an opening aligned with said port; an air valve in said air-valve chamber controlling the flow of air through said port and having a stem extending through said port, said branch passage, and said opening respectively, and projecting outside said wall; means adapted to engage the projecting end of said stem to unseat said air valve; an air inlet extending through said body into said air-valve chamber in substantially axial alignment with said air valve; an annular coupling threaded within said inlet; a spring engaging the inner annular end of said coupling and said air valve to urge said air valve into seated position; and a threaded nipple adapted to be secured to the discharge end of an air-supply hose, said nipple being threaded within and being adapted to conduct air through said annular coupling.

9. A cooling system flushing gun for cleaning automobile radiators and the like, comprising, in combination, a handle having parallel water and air inlet passages provided with control valves, and a nozzle communicating with said handle and being disposed at an obtuse angle with respect thereto, said nozzle and handle being joined by a hollow neck providing a common water and air passage into which said control valves are adapted to discharge, and said neck having a concave wall constituting a top for said nozzle.

10. A cooling system flushing gun as claimed by claim 9, in which said water control valve has a manually operable lever disposed at one side of said handle, and said air control valve has an operating trigger located in the angle between said nozzle and said handle.

HOWE H. HOPKINS.